Dec. 11, 1928.
C. C. TOMKINSON
1,694,494
TOGGLE BOLT
Filed June 19, 1925
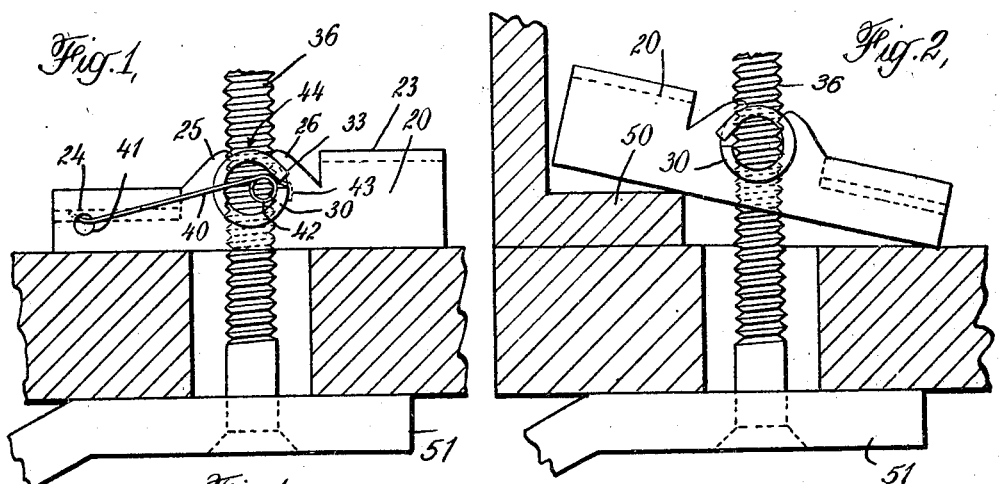
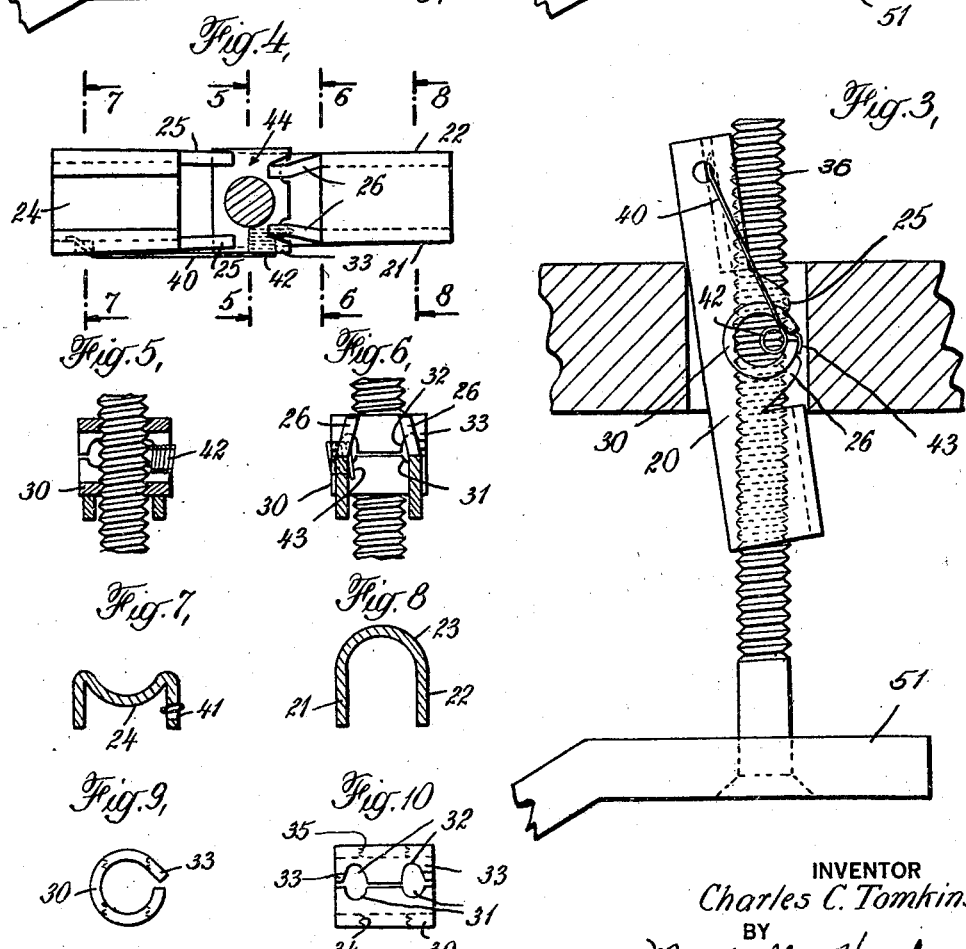
INVENTOR
Charles C. Tomkinson
BY
Marshall & Hawley
ATTORNEYS.

Patented Dec. 11, 1928.

1,694,494

UNITED STATES PATENT OFFICE.

CHARLES C. TOMKINSON, OF PLAINFIELD, NEW JERSEY, ASSIGNOR TO JOHN EDWARD OGDEN, OF MOUNTAINVILLE, NEW YORK.

TOGGLE BOLT.

Application filed June 19, 1925. Serial No. 38,194.

This invention relates to toggle bolts, such as are used for securing articles to walls or ceilings of brick, stone or cementitious material not adapted to directly receive a threaded member.

One of the objects of the invention is to provide a toggle bolt that is simple and practical in construction, comprises a minimum number of parts, can be economically manufactured and will be efficient in operation.

Another object of the invention is to provide a toggle bolt having a wing and nut so constructed and arranged as to form a strong anchorage capable of sustaining relatively heavy loads.

Further objects of the invention will appear from the following specification taken in connection with the drawings, which form a part of this application, and in which Fig. 1 is a sectional elevation showing a toggle bolt constructed in accordance with the invention, the bolt being illustrated as securing an article to a wall or ceiling;

Fig. 2 is a view similar to Fig. 1, but showing another operative position of the anchorage element;

Fig. 3 is a sectional elevation showing the bolt with the wing being inserted through an opening;

Fig. 4 is a top plan view of the wing and nut, the bolt being shown in section;

Figs. 5, 6, 7 and 8 are sectional elevations taken substantially on lines 5—5, 6—6, 7—7 and 8—8 of Fig. 4;

Fig. 9 is an end elevation of the nut; and

Fig. 10 is an elevational view of a nut taken at right angles to Fig. 9 looking toward the left.

The invention briefly described consists of a toggle bolt comprising a wing, a tubular nut rotatably mounted in the wing and a bolt threaded diametrically through the tubular nut. A spring engages the wing and nut for the purpose of rotating the wing with respect to the nut and the bolt after the wing has been inserted through the wall opening. Cooperating means are provided in the wing and nut for limiting the relative rotation of these elements and these cooperating means are preferably somewhat yieldable. Further details of the invention will appear from the following description.

In the embodiment of the invention shown, the wing 20 is formed with side walls 21 and 22 connected at one end by an outwardly curved portion 23 and at the opposite end by a reversely curved portion 24. The central portion of the wing intermediate the connected portions is recessed or cut away and provided with two pairs of upwardly extending lugs 25 and 26. The lugs 25 as shown in Fig. 4 are substantially parallel to the side walls 21 and 22 but the lugs 26 converge inwardly with reference to the side walls.

The nut 30 as shown in Figs. 9 and 10 is formed of a flat sheet metal blank which is rolled into substantially cylindrical shape, the meeting edges being recessed as shown at 31 and 32. The recesses 32 form lugs 33 which taper outwardly with respect to the longitudinal center of the nut and also extend slightly away from the cylindrical outer surface of the remaining portion of the nut (see Fig. 9).

As shown particularly in Fig. 4, the lugs 33 (see Fig. 9) of the nut, contact on their tapered edges with the tapered surfaces of the lugs 26 on the wing, thus forming a yieldable stop normally limiting the rotation of the wing with reference to the nut and bolt, by a spring in a manner hereafter set forth. The relative angularity of the two sets of lugs is such as to stop the head in a position substantially at right angles to the bolt, the head being normally retained in that position by the spring tension.

The lugs are strong enough to resist the spring tension but are yieldable so that the head can be rotated further to adapt itself to any irregular surfaces upon which it may be seated. The wedging contact between the lugs 33 and 26 provides a powerful means of bending the lugs and permits considerable angular movement of the head with slight distortion of the lugs.

The coacting lugs 33 and 26 also function to laterally retain the nut 30 in the wing 20 when held in contact by the spring 42 so that the bolt can be withdrawn and replaced without the nut falling out of its bearings.

When the nut and the wing are being assembled, the lugs 33 pass freely through the openings 44 in the top of the wing, providing a simple means of assembling.

The nut 30 is diametrically threaded as shown at 34, 35 to receive a bolt 36.

A spring 40 has one end secured to the wall 21 of the wing and extending through an opening 41 therein. The coiled portion 42 of the spring is disposed within the cylindrical nut 30 and the opposite end of the spring extends through one of the openings 31 and is bent around as shown at 43. From the showing in Figs. 1 and 4 it will be seen that the spring 42 engages or contacts with the nut 30 at the end 43 on the outside of the nut, at the end 43 where the spring engages the inner surface of the split portion in recess 32, by contact of the coil 42 with the inner surface of the nut, and by contact of the other end of the spring with the end of the nut. This firmly secures the spring in position.

The use of the toggle bolt will be clear from the foregoing description but as shown in Fig. 3, the wing 20 is first swung against the tension of the spring to a position in which the wing is substantially parallel to the bolt, the end of the bolt resting in the reversely curved portion 24 of the wing and the body of the bolt resting in the curved portion 23. When the wing has been inserted through the opening, the spring 40 will cause the wing to swing with respect to the bolt and nut until the stop lugs 26 and 33 coact to limit the swinging movement. These lugs normally stop the swinging of the wing when the wing reaches the position substantially at right angles to the bolt.

In Fig. 2 a projection or abutment 50 is shown at the inner end of the hole and the wing has been forced beyond the right angle position shown in Fig. 1, this being permitted by the yielding of the lugs 26 and the coacting parts 33 of the tubular nut, either or both.

It will be noted that the portions of the walls 21 and 22 of the wing are in tension when a load is placed on the bolt or when the bolt is supporting some article 51 and the tubular nut forms a truss member for sustaining the load, the nut being placed under compression.

Although one specific embodiment of the invention has been particularly shown and described, it will be understood that the invention is capable of modification and that changes in the construction and in the arrangement of the various cooperating parts may be made without departing from the spirit or scope of the invention, as expressed in the following claims.

What I claim is:

1. A toggle bolt comprising a wing having a bearing portion, a nut rotatably mounted in said bearing portion, a bolt threaded into said nut, said nut and wing having stop means for limiting the rotatable movement of the nut relative to the wing, and a spring acting on the nut and wing to effect relative rotation of these elements, said stop means and spring being constructed and arranged to retain the nut in the wing bearing portion.

2. A toggle bolt comprising a wing, a nut rotatably mounted therein intermediate the ends of the wing and having stop lugs engageable with the wing a bolt threaded into said nut, and a spring acting between the nut and wing and adapted to resiliently retain the stop lugs in engagement with the wing.

3. A toggle bolt comprising a wing, a nut rotatably mounted therein and having spaced stop lugs adapted to receive between them a portion of the wing, a bolt threaded into said nut, and a spring acting between the nut and wing and adapted to resiliently retain the stop lugs in engagement with the wing 4. In a toggle bolt, a single wing, a tubular nut adapted to receive a bolt and rotatably mounted in the wing and a spring acting on the nut and wing, said spring being secured at one end to the wing and extending into the tubular nut.

5. In a toggle bolt, a single wing, a tubular nut adapted to receive a bolt and rotatably mounted in the wing and a spring acting on the nut and wing, said spring being secured at one end to the wing and extending into and being secured to the interior of the tubular nut.

6. In a toggle bolt, a wing, a nut adapted to receive a bolt and pivoted in the wing and having a cavity therein and a spring partially located in the nut cavity and adapted to rotate the wing relative to the nut.

7. A toggle bolt comprising a single wing and a nut pivoted therein, a bolt threaded into said nut, said nut having lugs adapted to engage a portion of the wing and yieldable under stress to permit the wing to conform to irregularities of the surface on which it bears.

8. In a toggle bolt, a wing, a nut rotatably mounted therein and adapted to receive a bolt and yieldable stop means on the nut engageable with the wing for limiting the normal movement of the wing in one direction relative to the nut.

9. In a toggle bolt, a wing, a nut rotatably mounted therein and adapted to receive a bolt, yieldable stop means on the nut engageable with the wing for limiting the normal movement of the wing in one direction relative to the nut, and a spring acting between the nut and wing to cause rotation of one of said elements with respect to the other element.

10. In a toggle bolt, a wing having bearings open at the top and a tubular nut adapted to receive a bolt and having circumferentially disposed lugs, said nut being insertible in the bearings when the lugs are disposed in alinement with the openings in the bearings.

11. In a toggle bolt, a wing having a bearing open at the top and a nut insertible laterally into the bearing in a direction parallel to the axis of the bearing and having an offset portion adapted to pass through the open top thereof, said nut being adapted to receive a bolt.

12. In a toggle bolt, a wing having a bearing open at the top and a cylindrical nut insertible laterally into the bearing in a direction parallel to the axis of the bearing and having an offset portion adapted to pass through the open top thereof, said nut being adapted to receive a bolt.

13. In a toggle bolt, a wing, a tubular nut adapted to receive a bolt and rotatably mounted in said wing, means on said nut and wing adapted to coact in retaining the nut in the wing and a spring acting on said nut and wing.

14. In a toggle bolt, a wing, a cylindrical nut adapted to receive a bolt and rotatably mounted in said wing, offset means on said nut and wing adapted to coact in retaining the nut in the wing and a spring acting on said nut and wing.

15. In a toggle bolt, a wing, a tubular nut adapted to receive a bolt and rotatably mounted in said wing and having a slit extending lengthwise thereof, and yieldable means on the nut adjacent the slit adapted to coact with a portion of the wing to form a yieldable stop for limiting the rotation of the wing on the nut.

16. In a toggle bolt, a wing, a tubular nut adapted to receive a bolt and rotatably mounted in said wing and having a slit extending lengthwise of the nut, a pair of lugs on the nut adjacent said slit and lugs on the wing adapted to coact with the lugs on the nut to form a stop for limiting the rotation of the wing on the nut, the lugs on one of said members being disposed outside of the lugs on the other member.

17. In a toggle bolt, a wing, a tubular nut adapted to receive a bolt and rotatably mounted in said wing and having a slit extending lengthwise of the nut, a pair of lugs on the nut adjacent said slit and lugs on the wing adapted to coact with the lugs on the nut to form a stop for limiting the rotation of the wing on the nut, the lugs on one of said members being disposed outside of the lugs on the other member and in wedging relation with respect thereto.

18. In a toggle bolt, a wing, a tubular nut adapted to receive a bolt and rotatably mounted in said wing and having a slit extending lengthwise thereof, and yieldable lugs on the nut adjacent the slit adapted to coact with lugs of the wing to form a yieldable stop for limiting the rotation of the wing on the nut.

19. In a toggle bolt, a wing, a nut adapted to receive a bolt and rotatably mounted in said wing, a pair of lugs on said nut, a pair of lugs on the wing disposed in wedging relation with respect to the lugs on said nut and adapted to coact therewith to form a stop for limiting relative rotation between the nut and wing.

20. In a toggle bolt, a wing, a tubular nut adapted to receive a bolt and rotatably mounted in said wing and having a slit extending lengthwise of the nut, a pair of lugs on the nut adjacent said slit and lugs on the wing adapted to coact with the lugs on the nut to form a stop for limiting the rotation of the wing on the nut.

In witness whereof, I have hereunto set my hand this 17th day of June, 1925.

CHARLES C. TOMKINSON.